US008683239B2

(12) United States Patent
Hansalia et al.

(10) Patent No.: US 8,683,239 B2
(45) Date of Patent: *Mar. 25, 2014

(54) MANAGING POWER ALLOCATION TO ETHERNET PORTS IN THE ABSENCE OF MUTUALLY EXCLUSIVE DETECTION AND POWERING CYCLES IN HARDWARE

(75) Inventors: Rakesh Hansalia, Milpitas, CA (US); Adoor V. Balasubramanian, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,438

(22) Filed: Aug. 15, 2012

(65) Prior Publication Data
US 2012/0311355 A1  Dec. 6, 2012

Related U.S. Application Data

(63) Continuation of application No. 11/694,863, filed on Mar. 30, 2007, now Pat. No. 8,250,381.

(51) Int. Cl.
*G06F 1/26* (2006.01)
(52) U.S. Cl.
USPC ............................................ 713/300; 307/35
(58) Field of Classification Search
USPC .......................................... 713/300; 307/35
See application file for complete search history.

(56) References Cited

U.S. PATENT DOCUMENTS

| 5,406,260 | A | 4/1995 | Cummings et al. |
| 5,828,558 | A | 10/1998 | Korcharz et al. |
| 6,049,471 | A | 4/2000 | Korcharz et al. |
| 6,218,930 | B1 | 4/2001 | Katzenberg et al. |
| 6,473,608 | B1 | 10/2002 | Lehr et al. |
| 6,643,566 | B1 | 11/2003 | Lehr et al. |
| 6,839,215 | B2 | 1/2005 | Le Creff et al. |
| 6,841,979 | B2 | 1/2005 | Berson et al. |
| 6,973,394 | B2 | 12/2005 | Jaeger et al. |
| 6,985,713 | B2 | 1/2006 | Lehr et al. |
| 6,986,071 | B2 | 1/2006 | Darshan et al. |
| 6,992,599 | B2 | 1/2006 | Vergnaud et al. |
| 6,996,458 | B2 | 2/2006 | Pincu et al. |
| 7,006,815 | B2 | 2/2006 | Lehr et al. |
| 7,040,926 | B2 | 5/2006 | Ferentz |
| 7,046,983 | B2 | 5/2006 | Elkayam et al. |
| 7,068,781 | B2 | 6/2006 | Le Creff et al. |
| 7,117,272 | B2 | 10/2006 | Rimboim et al. |
| 7,142,951 | B2 | 11/2006 | Pincu et al. |

(Continued)

OTHER PUBLICATIONS

Linear Technology Corporation, LTC4259A—Quad IEEE 802.3af Power over Ethernet Controller with AC Disconnect, Datasheet, 2004.

*Primary Examiner* — Albert Wang
(74) *Attorney, Agent, or Firm* — Bever, Hoffman & Harms, LLP (57) ABSTRACT

A method of allocating power to ports in an Ethernet switch, including: (1) assigning a configuration power to a selected port, wherein the assigned configuration power is less than a power supplied by the selected port to a powered, (2) enabling and powering the selected port in a single indivisible step, (3) determining the power limit of a device coupled to the selected port, (4) comparing the power supplied by the selected port to the device with the configuration power assigned to the selected port, and (5) if the power supplied by the selected port to the device is greater than the configuration power assigned to the selected port, then increasing the configuration power of the selected port to correspond with the power limit of the device.

20 Claims, 4 Drawing Sheets

(56) References Cited

U.S. PATENT DOCUMENTS

| | | |
|---|---|---|
| 7,145,439 B2 | 12/2006 | Darshan et al. |
| 7,146,258 B2 | 12/2006 | Pincu et al. |
| 7,154,381 B2 | 12/2006 | Lang et al. |
| 7,155,622 B2 | 12/2006 | Mancey et al. |
| 7,159,129 B2 | 1/2007 | Pincu et al. |
| 7,170,194 B2 | 1/2007 | Korcharz et al. |
| 7,203,849 B2 | 4/2007 | Dove |
| 7,272,669 B2 | 9/2007 | Mattur et al. |
| 7,337,336 B2 | 2/2008 | Ferentz et al. |
| 7,340,620 B2 | 3/2008 | Dove |
| 7,373,528 B2 | 5/2008 | Schindler |
| 7,478,251 B1 | 1/2009 | Diab et al. |
| 7,509,505 B2 | 3/2009 | Randall et al. |
| 7,631,201 B2 | 12/2009 | Hansalia |
| 7,774,628 B2 | 8/2010 | Hansalia |
| 2003/0146765 A1 | 8/2003 | Darshan et al. |
| 2003/0194912 A1 | 10/2003 | Ferentz |
| 2004/0236967 A1 | 11/2004 | Korcharz et al. |
| 2005/0243861 A1 | 11/2005 | Elkayam et al. |
| 2006/0109728 A1 | 5/2006 | Dwelley et al. |
| 2006/0112285 A1 | 5/2006 | Stineman, Jr. |
| 2006/0149978 A1 | 7/2006 | Randall et al. |
| 2006/0164062 A1 | 7/2006 | Stineman, Jr. et al. |
| 2006/0164098 A1 | 7/2006 | Su |
| 2006/0164108 A1 | 7/2006 | Herbold |
| 2006/0164769 A1 | 7/2006 | Stanford et al. |
| 2006/0164773 A1 | 7/2006 | Stanford et al. |
| 2006/0164774 A1 | 7/2006 | Herbold et al. |
| 2006/0164775 A1 | 7/2006 | Stineman, Jr. et al. |
| 2006/0165096 A1 | 7/2006 | Heath et al. |
| 2006/0166706 A1 | 7/2006 | Dwelley et al. |
| 2006/0168458 A1 | 7/2006 | Stineman, Jr. et al. |
| 2006/0210057 A1 | 9/2006 | Stanford |
| 2007/0019560 A1 | 1/2007 | Brewer et al. |
| 2007/0021094 A1 | 1/2007 | Elkayam et al. |
| 2008/0052546 A1 | 2/2008 | Schindler et al. |

# MANAGING POWER ALLOCATION TO ETHERNET PORTS IN THE ABSENCE OF MUTUALLY EXCLUSIVE DETECTION AND POWERING CYCLES IN HARDWARE

RELATED APPLICATION

This application is a continuation of U.S. patent application Ser. No. 11/694,863 filed Mar. 30, 2007.

FIELD OF THE INVENTION

The present invention relates to a power over Ethernet (PoE) system. More specifically, embodiments of the present invention relate to an improved method for pre-allocating power to ports in a PoE system that simultaneously enables and powers the ports in a single, indivisible step.

RELATED ART

In a power over Ethernet (PoE) system, one or more Ethernet devices connected to an Ethernet network are powered over the network cables. Power sourcing equipment located in an Ethernet switch is used to supply the power on the network cables. Ethernet devices which are configured to operate in response to the power supplied on the network cables are commonly referred to as powered Ethernet devices, or simply powered devices (PDs). As defined herein, Ethernet devices which are configured to receive power from a separate power supply (e.g., a conventional 120 Volt AC outlet) will be referred to as non-system powered Ethernet devices.

The power sourcing equipment of a PoE system has a known power capacity, which identifies the amount of power that can be reliably supplied to powered devices coupled to the Ethernet switch. The system software dictates that the PoE power capacity is always treated as limited. The system software must therefore manage the power capacity by controlling the allocation of power to the various ports of the Ethernet switch, in order to avoid overloading the power sourcing equipment (and the associated consequences).

Power allocation has been performed as follows in certain conventional Ethernet switches (such as Ethernet switches that include a port control circuit such as is commonly available from Linear Technology Corp. (LTC) as part number LTC4259ACGW#PBF). First, the system software performs a search on all of the ports of the Ethernet switch to identify the ports coupled to powered devices, and determine the number of powered devices connected to the Ethernet switch. The hardware in the Ethernet switch allows this step to be performed before providing power to the ports. The system software then attempts to pre-allocate power to the ports that are connected to powered devices, starting with the highest priority port and proceeding to the lowest priority port. The system software then enables power to be supplied to the ports where power was successfully pre-allocated.

To accomplish this, the system software compares the power required by the highest priority port coupled to a powered device with the remaining power capacity of the power sourcing equipment. If the remaining power capacity (i.e., the power pool) is greater than the power required by this port, then the system software pre-allocates the required power to this port, and enables power to be supplied to this port. This process is performed until all ports coupled to a powered device are enabled to receive power, or until the remaining power capacity of the power sourcing equipment is insufficient to reliably supply power to any more of the powered devices.

In order to pre-allocate power in the above-described manner, the hardware present in the Ethernet switch must include hardware support for initially detecting a powered device on a port, without having to enable power on the port. However, some Ethernet switches do not include such hardware support. For example, some Ethernet switches (such as Ethernet switches that include a port control circuit such as is commonly available from PowerDsine Ltd. as part number PD64012G), include hardware that provides a single enable control. In such Ethernet switches, the system software detects the presence of a powered device on a port, and enables power to be supplied to the port in a single, indivisible operation. Thus, power cannot be pre-allocated in these Ethernet switches in the manner described above. Instead, the system software must pre-allocate power assuming that each enabled port is coupled to a powered device (even if none of the enabled ports are coupled to powered devices). Pre-allocating power in this manner will quickly reduce the calculated remaining power capacity to zero. As a result, it may not be possible to enable some ports (even though actual power capacity exists to supply these ports). The software may never address the power needs of these ports. This problem becomes worse in Ethernet switches having a large number of ports (i.e., 192 ports). Note that typical power supply equipment used in an Ethernet switch is not capable of powering 192 ports at the maximum rated power of 15.4 Watts per port.

The Institute of Electrical and Electronic Engineers (IEEE) have promulgated the IEEE 802.3af standard, which defines the operating conditions of PoE systems. To conform with this standard, the system software must pre-allocate power on all ports before enabling power on the ports, regardless of whether powered devices are connected to the ports or not. This ensures that the available power capacity is appropriately managed and avoids overloading the power supply equipment. Failure to pre-allocate power will cause the Ethernet switches of the second type to fail to meet the specifications of the IEEE 802.3af standard.

Moreover, the hardware within an Ethernet switch that implements a single enable control will trip the ports based on hardware priority group. By default, all ports have the same (low) priority, and therefore, all ports are tripped randomly by the hardware. However, if ports are assigned different priorities based on the user configurations, lower priority ports trip first, followed by the next lower priority ports, and so on. Among ports of the same priority, ports are affected randomly.

It would therefore be desirable to have a method for pre-allocating power in an Ethernet switch that detects the presence of a powered device and enables power to the powered device in a single, indivisible operation. It would further be desirable for this method to allocate power in a manner that provides fairness to all ports in the Ethernet switch.

SUMMARY

Accordingly, the present invention provides an improved method for pre-allocating power to the ports of an Ethernet switch that includes hardware that supplies power to a port and detects the presence of a powered device on the port in a single step.

In an exemplary embodiment, the system software initially determines the available capacity of the power sourcing equipment, and defines this capacity as the initially available power pool. The system software also assigns a configuration power of 0 Watts to each of the ports. Thus, the configuration power of each port is initially set to 0 Watts in both hardware and software. The system software also assigns a priority to each of the ports of the Ethernet switch.

Each port may then be enabled in the following manner. The system software initially enables Power over Ethernet (PoE) on a selected port (typically in response to a user command). That is, the system software enables the selected port, and instructs this port to provide power to a device connected to the port. When the selected port has been enabled, the port hardware determines whether an overload condition exists by comparing the power actually drawn by the connected device to the configuration power assigned to the port. If there is no powered device connected to the enabled port, then no power is drawn from the port, and no overload condition exists. In this case, the system software takes no more action. That is, the configuration power of the enabled port remains at 0 Watts in both hardware and software. Note that no power is removed from the available power pool in this case.

If an overload condition is detected on the port, this indicates that a powered device is connected to the port. The overload condition is caused by the powered device attempting to draw power that exceeds the assigned configuration power of 0 Watts. Upon detecting an overload condition in combination with an assigned configuration power of 0 Watts, the system software enters a re-allocation state. In this re-allocation state, the system software determines the power limit of the powered device by examining class information obtained from the powered device when the port was initially enabled. The system software then determines whether there is enough power available in the power pool to supply the powered device. If the power available in the power pool is greater than the power limit of the powered device, then the software subtracts the power limit of the powered device from the power pool, and increases the configuration power of the port from 0 Watts to the power limit of the powered device. Under these conditions, the port supplies the power required by the powered device, up to the power limit of the powered device. Note that the configuration power of the port has the same value (i.e., the power limit of the powered device) in both hardware and software.

If there is insufficient power available in the power pool to allocate the power required by the powered device, then the system software determines whether lower priority ports are currently drawing power, which when added to the available power pool, would be capable of supplying the powered device. If so, the system software issues a command to remove power from the lower priority ports, places the lower priority ports in an 'out of power' state, and places the port associated with the powered device into a 'pending power allocation' state. After the lower priority ports are disabled, the associated power is added to the available power pool, and the port associated with the powered device is enabled and powered (i.e., removed from the 'pending power allocation' state).

If it is not possible to retrieve power sufficient to supply the powered device by disabling lower priority powered ports, the associated port is placed in the 'out of power' state. If additional power subsequently becomes available, ports in the 'out of power' state may be enabled and powered.

If the powered device is subsequently disconnected from the enabled port, the system software detects this occurrence, resets the configuration power of the port to 0 Watts in both hardware and software, and adds the power limit of the disconnected device back to the available power pool.

In this manner, the allocated power in hardware and software remains the same throughout all phases of operation, thereby preventing power allocation problems.

The present invention will be more fully understood in view of the following description and drawings.

DETAILED DESCRIPTION

The present invention provides an improved method for pre-allocating power in a system that uses an Ethernet switch that detects the presence of a powered device and enables power to the powered device in a single, indivisible operation.

Figure 1:
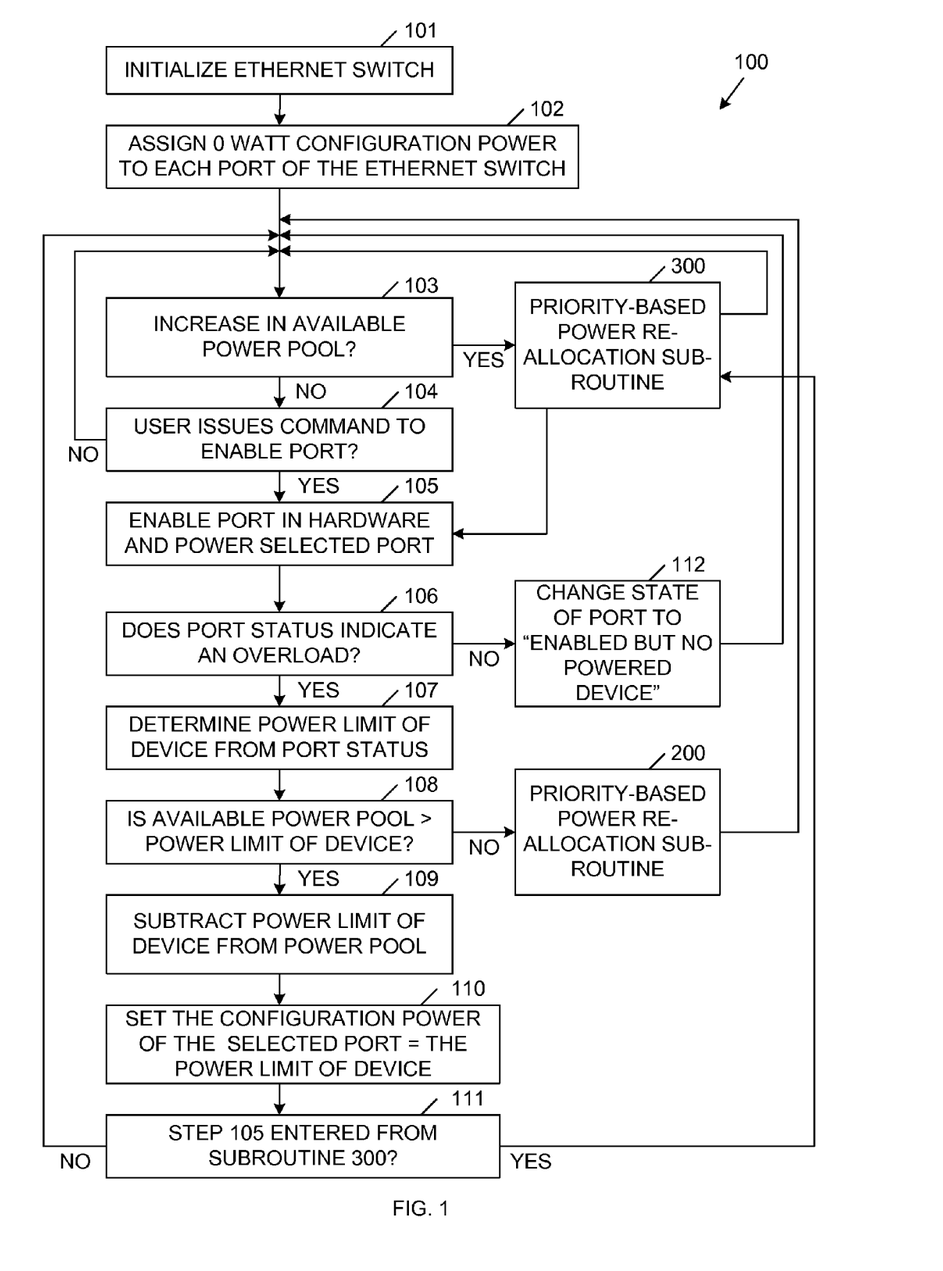
FIG. 1 is a flow diagram illustrating a method of pre-allocating power to the ports of an Ethernet switch in accordance with one embodiment of the present invention.

FIG. 1 is a flow diagram 100 illustrating a method in accordance with one embodiment of the present invention. The Ethernet switch is initialized in Step 101. In general, this initialization step resets the Ethernet switch, determines the amount of power available to supply powered devices (i.e., determines the capacity of the power sourcing equipment, or the size or the 'power pool'), and sets the priority of the various ports of the Ethernet switch. For example, the initial available capacity of the power pool may be 1080 Watts (at 48 Volts).

In Step 102, which may be considered part of the initialization of the Ethernet switch, the system software assigns a configuration power of 0 Watts to each port of the Ethernet switch. The configuration power is defined as the maximum rated power to be supplied to a port. Assigning a configuration power of 0 Watts to a port effectively assumes that the port will be coupled to a non-system powered device. Note that a powered device will typically exhibit a power requirement (i.e., power limit) of 15.4 Watts. By the end of Steps 101 and 102, the system software is provided with the available capacity of the power pool, the configuration power of each port (0 Watts), and the priority of each port.

Figure 3:
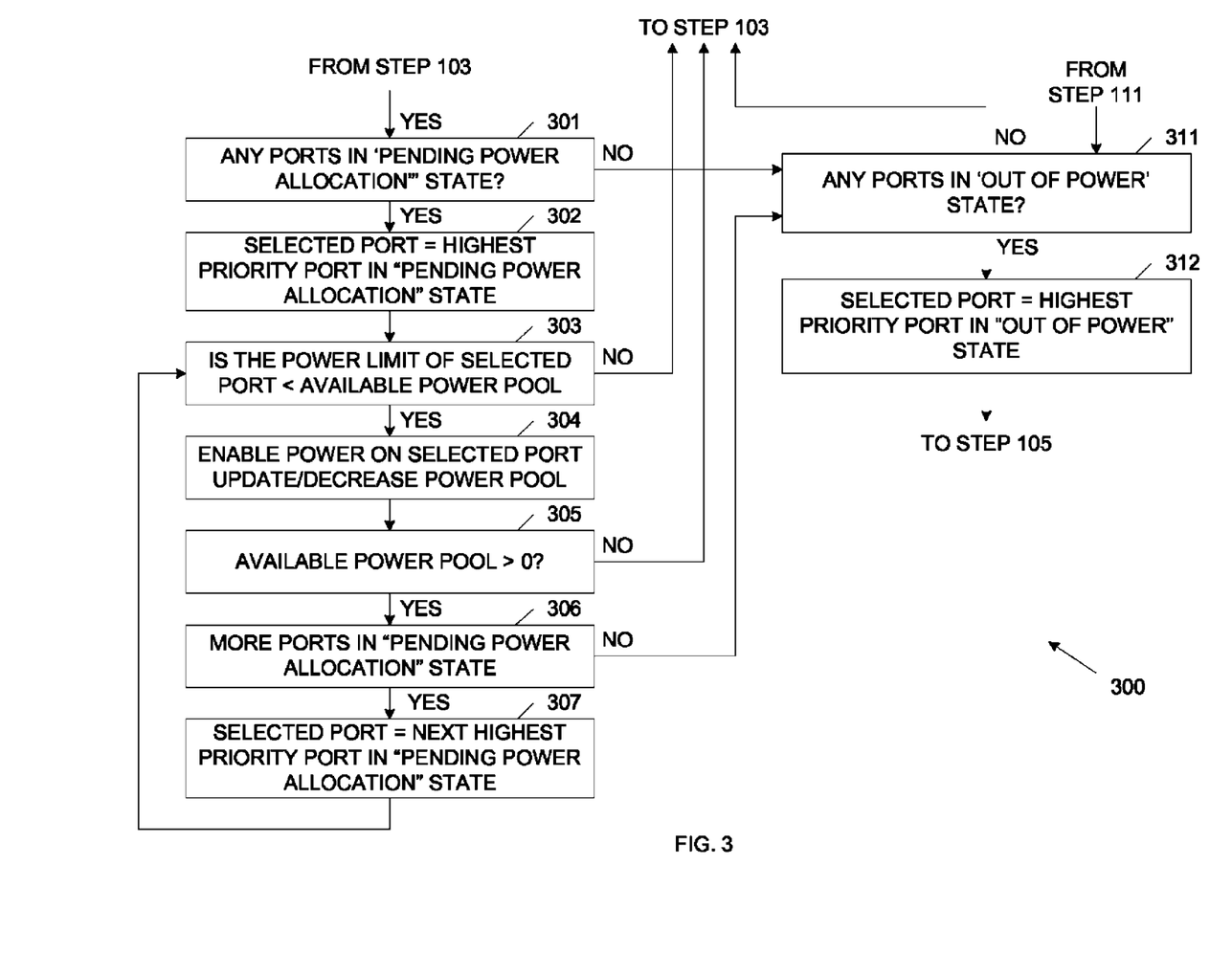
FIG. 3 is a flow diagram illustrating a sub-routine that allocates newly available power to various ports in accordance with one embodiment of the present invention.

After each port has been assigned a 0 Watt configuration power, the system software determines whether there has been an increase in the available power pool (Step 103). As described in more detail below, the available power pool may be increased by various events, including the connection of an additional power supply, or the disconnection of a powered device. As described in more detail below, if the available power pool is increased (Step 103, Yes branch), then power is allocated among various ports that have been identified as needing power (Subroutine 300). In the described example, it is assumed that there is no initial increase in the available power pool (Step 103, No branch), such that processing proceeds to Step 104.

In Step 104, the user may issue a command line interface (CLI) command to the Ethernet switch, thereby instructing the Ethernet switch to enable a selected port (Step 104, Yes branch). In response to this CLI command, the system software enables and powers the selected port in a single, indivisible step by hardware present in the Ethernet switch (Step 154). The system software also changes the state of the selected port to an 'enabled and powered' state by the end of Step 105. Although the selected port is powered on, the assigned configuration power of this port is 0 Watts. In accordance with one embodiment, the user enables the ports in order of assigned priority.

The selected port compares its assigned configuration power with the actual power drawn by the device connected to the selected port. This comparison determines whether an overload condition exists on the selected port (Step 106). If the actual power drawn from the selected port exceeds the configuration power assigned to this port, an overload signal is asserted, thereby indicating that an overload condition exists (Step 106, Yes branch). Conversely, if the actual power drawn from the selected port is less than or equal to the configuration power assigned to this port, the overload signal is de-asserted, thereby indicating that no overload condition exists (Step 106, No branch).

If the device connected to the selected port is a non-system powered Ethernet device, then this device will not draw any power from the selected port. Similarly, if there is no device connected to the port at all, then no power will be drawn from the selected port. In this cases, no overload is detected on the selected port (Step 106, No branch). In response, the system software changes the state of the port to "enabled but no powered device", and notifies the user of this state (Step 112). Note that the power pool is not adjusted in this instance. Also note that the configuration power remains identical (i.e., 0 Watts) in both the hardware port and the system software throughout this process. Processing for the selected port then returns to Step 103.

If the device connected to the selected port is a powered device, then this device will draw a positive power from the selected port. In this case, an overload condition is detected on the selected port, because the positive power drawn by the device exceeds the configuration power (i.e., 0 Watts) assigned to the selected port (Step 106, Yes branch). The system software enters a special state upon detecting an overload condition on a port that has an assigned configuration power of 0 Watts. This special state is hereinafter referred to as a reallocation state. In this state, the system software determines the power limit of the powered device from the port status information of the selected port (Step 107). Note that once the selected port has been enabled in Step 105, the selected port initiates the detection and classification of the device connected on the port, based on the IEEE 802.3af standard. During this process, the selected port receives and stores class information from the device connected on the port. The class information includes the power limit of the device connected on the selected port. The selected port may provide this received class information (including the power limit) to the system software via port status signals. This enables the system software to determine the power limit of the powered device in Step 107.

Figure 2:
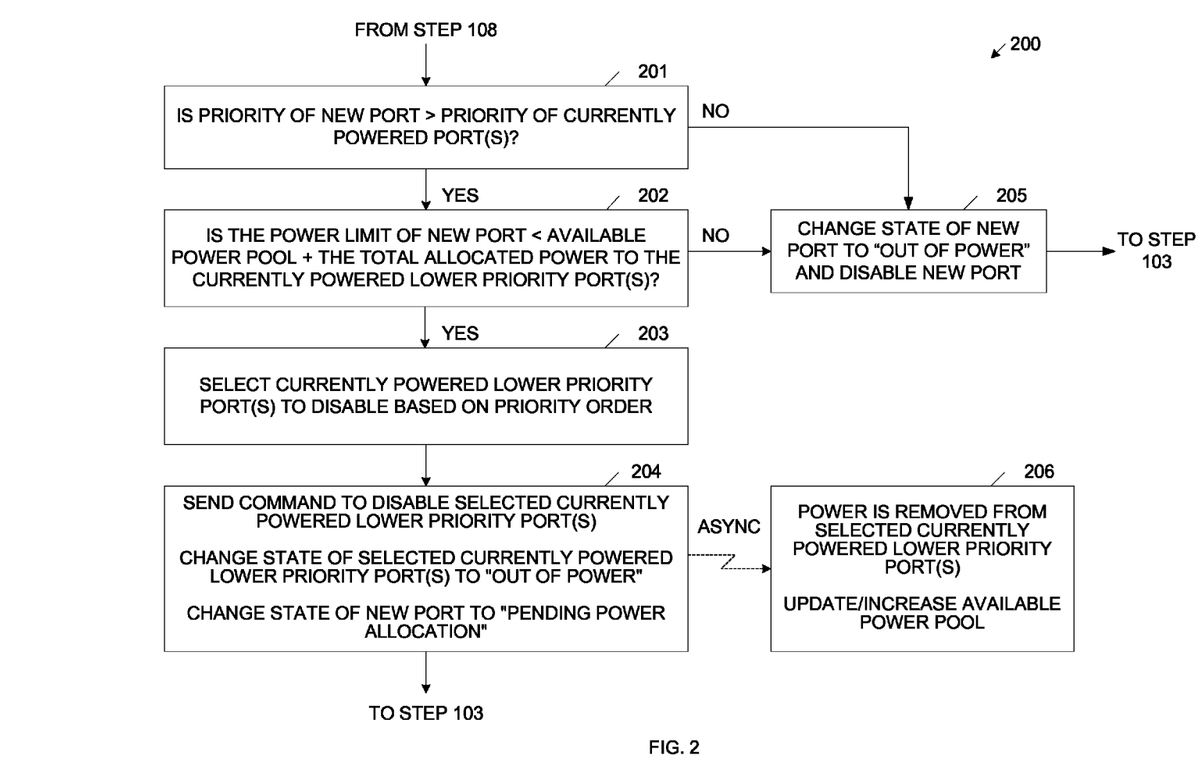
FIG. 2 is a flow diagram illustrating a sub-routine that performs power re-allocation from low priority powered ports to a high priority powered port, in accordance with one embodiment of the present invention.

The system software then determines whether the power available in the power pool exceeds the power limit of the powered device connected to the selected port by performing a comparison operation (Step 108). That is, the system software determines whether there is sufficient power available to supply the powered device. If not (Step 108, No branch), the system software proceeds to priority-based power re-allocation sub-routine 200, which is described in more detail below.

However, if the power available in the power pool is sufficient to supply the powered device connected to the selected port (Step 108, Yes branch), then the system software subtracts the power limit of the powered device from the available power pool (Step 109), and sets the configuration power of the selected port equal to the power limit of the powered device (Step 110). For example, if the power limit of the powered device is 15.4 Watts, then the system software increases the configuration power of the selected port from 0 Watts to 15.4 Watts, and reduces the power pool capacity by 15.4 Watts.

At this time, the powered device may draw power from the selected port, up to the limit identified by the new configuration power of the port. Processing then proceeds to Step 111, which determines whether Step 105 was entered from sub-routine 300. In the described flow, Step 105 was not entered from sub-routine 300, but rather from Step 104 (Step 111, No branch). In this case, the process returns to Step 103, wherein the system determines whether there has been an increase in the available power pool. Note that if Step 111 was entered from sub-routine 300 (Step 111, Yes branch), then processing will return to sub-routine 300.

Practitioners will appreciate that the method of FIG. 1 can be varied without departing from its broader inventive concepts. For instance, the configuration power assigned in Step 102 need not be 0 Watts. The configuration power assigned may be any power value less than the lowest expected operating power of a powered device connected to the port, so that the re-allocation state may be entered when a powered device is connected to the port. Once the port is enabled and powered with the assigned configuration power, the device will provide class information including the power limit of the powered device to the port. This information can be stored, and used in Step 106 et seq. of FIG. 1. For instance, the pre-allocated configuration power may be 0 to 1 Watt, e.g., 0.1 Watt. A low configuration power is typically better, hence the example of 0 Watts, because whatever is initially assigned for the configuration power is subtracted from the initially available power pool. Also, a lower configuration power may allow for faster detection of any overload conditions.

FIG. 2 is a flow diagram illustrating sub-routine 200 in accordance with one embodiment of the present invention. In general, sub-routine 200 performs power re-allocation which may be necessary when a high priority powered port is enabled after a low priority powered port.

As described above in connection with the 'No branch' of Step 108, if the power limit of a powered device is greater than the available capacity of the power pool, then processing proceeds to priority-based power re-allocation sub-routine 200. More specifically, processing proceeds to Step 201 of sub-routine 200, wherein the system software determines whether the priority assigned to the new port is greater than the priority assigned to any port in the "enabled and powered" state.

If the priority of the new port is not greater than the priority of any currently powered port (Step 201, No branch), then it is not currently possible to reallocate power to the new port. In this case, processing proceeds to Step 205, where the system software changes the state of the new port to an "out of power" state, and disables the new port. As described in more detail below, the new port will remain in the "out of power" state until power is added to the available power pool. Processing then returns to Step 103.

If the priority of the new port is greater than the priority of one or more enabled and powered ports (Step 201, Yes branch), it may be possible to re-allocate power from the lower priority powered ports to the higher priority new port. In this case, the system software determines whether the total configuration power of all such lower priority ports plus the available power in the power pool exceeds the power limit of the device coupled to the new port (Step 202). If not, (Step 202, No branch), processing proceeds to Step 205, wherein the system software changes the state of the new port to the "out of power" state. If so (Step 202, Yes branch), the system software determines which of the currently powered port(s) should be disabled to provide power for the new port (Step 203). This determination is based on priority of the currently powered port(s), with the lowest priority port(s) selected first. The system software changes the state of the selected lower priority "enabled and powered" ports to an "out of power" state, sends a command to disable and remove power from these ports, and changes the state of the new port to a "pending power allocation" state (Step 204). Processing then returns to Step 103.

Note that the system software does not ever disable currently powered lower priority ports, unless the system software determines that the combined configuration powers of these lower priority ports plus the available power pool exceeds the required configuration power of the new port, and that the re-allocation is feasible.

Power is removed from the selected lower priority ports in an asynchronous manner (Step 206). That is, power is not instantaneously removed from the selected lower priority ports. Rather, this process will typically require a relatively long processing period (i.e., longer than the time required for processing to return to Step 103). The power recovered from the selected lower priority ports is not added to the available power pool until after this power is actually recovered (Step 206). Thus, the available power pool will likely not have increased by the time that processing returns to Step 103.

If there is no increase in the available power pool by the time that processing returns to Step 103 (Step 103, No branch), then processing continues to Step 104 in the manner described above. That is, power is not immediately provided to the new port in the 'pending power allocation' state because the power associated with the selected lower priority ports has not yet been released to the available power pool. It is possible for more than one port to enter the 'pending power allocation' state before there is an actual increase in the available power pool.

When the selected lower priority ports have been successfully disabled, and the associated power has been added back to the available power pool (Step 103, Yes branch), processing proceeds to subroutine 300. Note that processing may also proceed to subroutine 300 if the available power pool is increased for other reasons For example, the available capacity of the power pool increases if a previously detected powered device is disconnected, or the user disables a port previously enabled to supply a powered device (i.e., a powered device is powered off). Moreover, the available capacity of the power pool will increase if a low-priority powered device is powered off because it is pre-empted by a high-priority non-powered device (or a high-priority powered device having a lower configuration power). The available capacity of the power pool will also increase if additional power sourcing equipment is added to the Ethernet switch.

Upon entering subroutine 300, the system software determines whether there are any ports in the 'pending power allocation' state. If there are no ports in the 'pending power allocation' state (Step 301, No branch), processing proceeds to Step 311, wherein the system software determines whether there are any ports in the 'out of power state'. If there are no ports in the 'out of power' state, then processing returns to Step 103 (Step 311, No branch). In this case, there are no ports that require the newly available capacity of the power pool.

However, if there are one or more ports in the 'pending power allocation' state (Step 301, Yes branch), then the system software selects the highest priority port in the 'pending power allocation' state (Step 302). The system software then determines whether the power limit of the selected port is greater than the capacity of the available power pool. If not, processing returns to Step 103 (Step 303, No branch). However, if the power limit of the selected port is less than tha capacity of the available power pool (Step 303, Yes branch), then the system software enables and powers the selected port, and reduces the available power pool by the configuration power of the selected port (Step 304). Processing then proceeds to Step 305.

If the capacity of the available power pool is not greater than zero (Step 305, No branch), then processing returns to Step 103. However, if there is still capacity remaining in the available power pool (Step 305, Yes branch), then the system software determines whether there are any additional ports in the 'pending power allocation' state (Step 306). If so (Step 306, Yes branch), then the system software selects the highest priority port in the 'pending power allocation' state (Step 307). Processing then returns to Step 303, thereby enabling the selected port to be enabled and powered if there is sufficient power in the available power pool.

If there is still remaining capacity in the available power pool (Step 305, Yes branch), but there are no additional ports in the 'pending power allocation' state (Step 306, No branch), then processing proceeds to Step 311. If there are no ports in the 'out of power' state (Step 311, No branch), then processing returns to Step 103.

However, if there are any ports in the 'out of power' state (Step 311, Yes branch), then the system software selects the highest priority port in the 'out of power' state. Processing then returns to Step 105, wherein this selected port is enabled (i.e., taken out of the 'out of power' state) and powered. Processing then proceeds from Step 105 in the manner described above. If processing reaches Step 111, then processing returns to subroutine 300 (Step 111, Yes branch), because Step 105 was entered from subroutine 300. More specifically, processing returns to Step 311 of subroutine 300. If there are additional ports in the 'out of power' state, then the system software will try to enable and power these additional ports (Step 311, Yes branch). If there are no additional ports in the 'out of power' state, then processing returns to Step 103.

In the above-described manner, the system software of the present invention uses a pre-allocation of power scheme as the primary means of controlling the allocation of power to the ports. This scheme therefore operates in accordance with the IEEE 802.3af standard.

Note that during power-on of the Ethernet switch, the hardware may detect many port connections. However, in accordance with the present invention, the software will sequentially enable ports in the manner described above, rather than simultaneously trying to supply power all ports.

Figure 4:
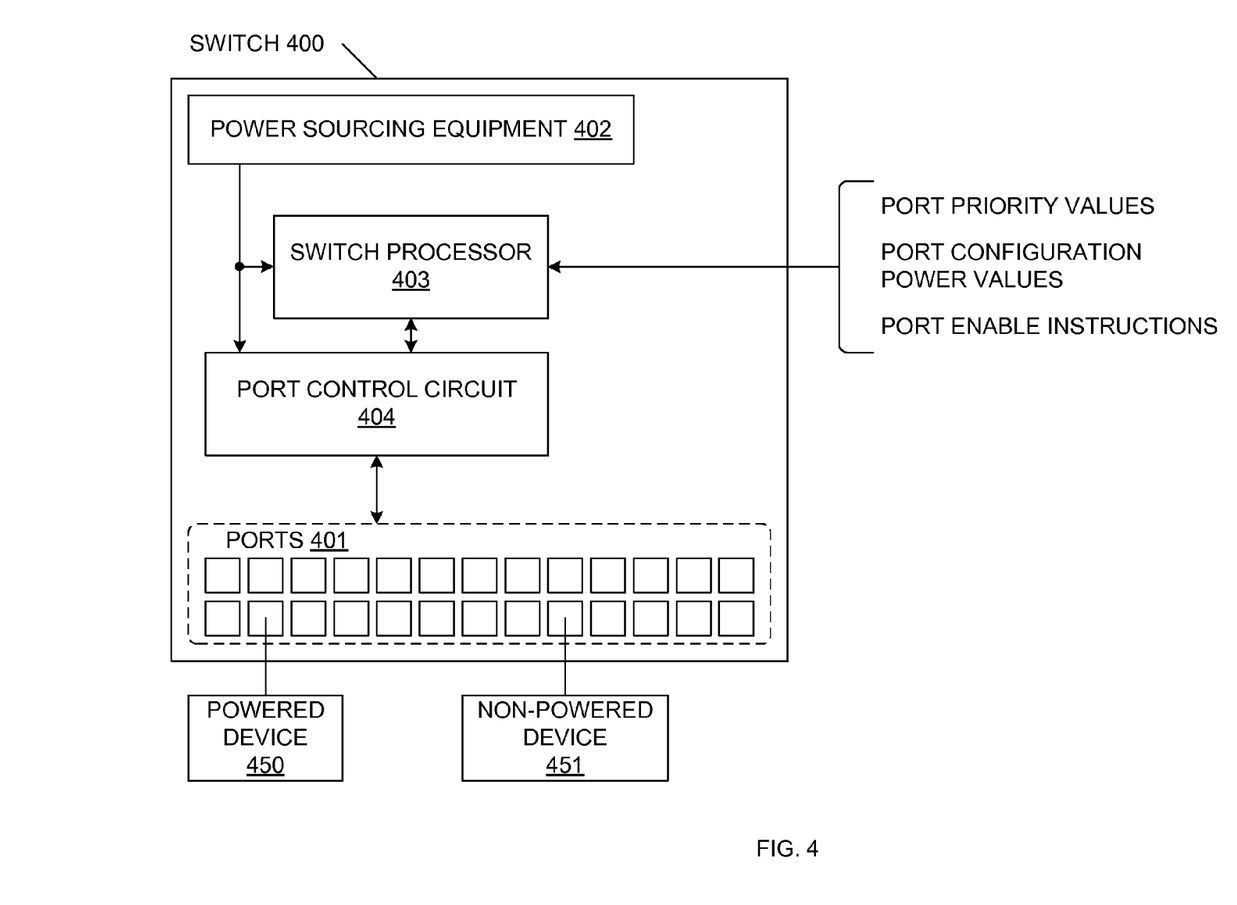
FIG. 4 is a block diagram of an Ethernet switch in accordance with one embodiment of the present invention.

FIG. 4 is a block diagram of an Ethernet switch 400 in accordance with one embodiment of the present invention. Switch 400 includes a plurality of ports 401, power sourcing equipment 402, switch processor 403 and port control circuit 404. Powered device 450 and non-powered device 451 are shown coupled to corresponding ports of switch 400. Ports 401 send data to and receive data from, e.g., class information, powered device 450 and non-powered device 451, thereby facilitating the above-described communications between switch 400 and devices 450, 451. In an alternate embodiment, power sourcing equipment 402 may be located external to switch 400.

Switch processor 403 receives and stores the port priority values, the port configuration power values and the port enable instructions from the user of switch 400. Switch processor 403 is also coupled to receive and store the total initial power pool capacity from power sourcing equipment 402. In general, switch processor 403 implements the system software functionality described above in connection with FIGS.

1-3. That is, switch processor 403 determines the ports to be enabled and powered by port control circuit 404, provides instructions to port control circuit 404 to enable and power the selected ports, receives class information from port control circuit 404 including the power limits of devices coupled to the various ports 401, and maintains an accounting of the available power pool.

Port control circuit 404 is configured to receive the power supplied from power sourcing equipment 402 and the instructions provided by switch processor 403. In general, port control circuit 404 implements the 'hardware' functions described above in connection with FIGS. 1-3. That is, port control circuit 404 enables and powers each selected port in a single indivisible step, detects whether an overload condition exists on the selected port during the 'enable and power' step, disables power to the selected port if a powered device is detected, and then notifies switch processor 403 of the results. Port control circuit 404 also communicates with powered device 450 and non-powered device 451 via ports 401.

In the example configuration of FIG. 4, switch processor 403 is assumed to have an internal memory for storing instructions and data relevant to the methods disclosed herein. Practitioners will appreciate, however, that switch 400 may instead have a memory structure(s) external to switch processor 403 for storing such instructions and data and coupled for communicating such instructions and data to processor 403, and/or for receiving data from the ports.

Examples provided above include an Ethernet switch capable of providing power via one or more of its ports and a data line to an external powered device. Alternatively, instructions to perform the methods of FIGS. 1-3 and the circuits and other structures of FIG. 4 may be disposed in a mid-span device that is coupled between the powered device and an external Ethernet switch that is not capable of providing power to the powered device.

Although the present invention has been described in connection with various embodiments, it is understood that variations of these embodiments would be obvious to one of ordinary skill in the art. Thus, the present invention is limited only by the following claims.

We claim:

1. A method of allocating power among one or more ports in a switch, comprising:
   pre-allocating a first configuration power to a selected port, wherein the first configuration power is representative of a power drawn from the selected port by a non-system powered device coupled to the selected port;
   determining whether a device coupled to the selected port draws more power than the first configuration power; and
   allocating a second configuration power representative of a power limit of the device to the selected port if the selected port draws more power than the first configuration power.

2. The method of claim 1, further comprising selecting the first configuration power to have a value less than the lowest expected operating power of any device powered by the selected port.

3. The method of claim 1, further comprising selecting the first configuration power to be zero.

4. The method of claim 1, further comprising selecting the first configuration power to have a value in the range of 0 Watts to 1 Watt.

5. The method of claim 1, further comprising enabling and powering the selected port in a single indivisible step after pre-allocating the first configuration power.

6. The method of claim 1, further comprising determining the power limit of the device from class information received at the selected port via the device.

7. The method of claim 1, further comprising:
   determining an available power capacity of the switch; and
   determining that the available power capacity is greater than the power limit of the device prior to allocating the second configuration power to the selected port.

8. The method of claim 7, further comprising subtracting the power limit of the device from the available power capacity prior to allocating the second configuration power to the selected port.

9. The method of claim 7, further comprising:
   determining whether the one or more ports include one or more powered ports having a lower priority than the selected port, and if so, then;
   determining whether disabling the one or more powered ports having the lower priority will increase the available power capacity to a level greater than the power limit of the device, and if so, then disabling the one or more powered ports having the lower priority, and then allocating the second configuration power to the selected port.

10. The method of claim 7, further comprising disabling the selected port until the available power capacity is greater than the power limit of the device.

11. The method of claim 1, further comprising pre-allocating the first configuration power to each of the one or more ports in the switch.

12. A method of allocating power among one or more ports in a switch, comprising:
   assigning a first configuration power to a selected port, wherein the first configuration power is less than any power drawn from the selected port by a device powered by the selected port;
   determining that a device coupled to the selected port draws more power than the first configuration power, and in response, increasing the configuration power assigned to the selected port to a second configuration power that corresponds with a power limit of the device.

13. The method of claim 12, further comprising selecting the first configuration power to have a value in the range of 0 Watts to 1 Watt.

14. The method of claim 12 further comprising determining the power limit of the device from class information received at the selected port via the device.

15. The method of claim 12 further comprising:
   determining an available power capacity of the switch; and
   determining that the available power capacity is greater than the power limit of the device prior to assigning the second configuration power to the selected port.

16. The method of claim 12, further comprising initially assigning the first configuration power to each of the one or more ports in the switch.

17. A switch comprising:
   a port;
   a processor that pre-allocates a first configuration power to the port, wherein the first configuration power is less than any power drawn from the port by a device powered by the port; and
   port control circuitry that determines whether a device coupled to the port draws more power than the first configuration power, and re-allocates a second configuration power representative of a power limit of the device to the port if the port draws more power than the first configuration power.

18. The switch of claim 17, wherein the first configuration power has a value in the range of 0 Watts to 1 Watt.

19. The switch of claim 17, wherein the port control circuitry includes means for enabling and powering the port in a single indivisible step.

20. The switch of claim 17, wherein the port control circuitry includes circuitry for determining the power limit of the device from class information provided by the device to the port.

* * * * *